(12) United States Patent
Carpenter

(10) Patent No.: US 11,618,340 B2
(45) Date of Patent: Apr. 4, 2023

(54) MISSING RECEIVER POWER SUSTAIN DEACTIVATION

(71) Applicant: Ford Global Technologies, LLC, Dearborn, MI (US)

(72) Inventor: Toussaint Carpenter, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 632 days.

(21) Appl. No.: 16/743,651

(22) Filed: Jan. 15, 2020

(65) Prior Publication Data
US 2021/0213850 A1    Jul. 15, 2021

(51) Int. Cl.
| | |
|---|---|
| *B60L 58/10* | (2019.01) |
| *H04L 12/40* | (2006.01) |
| *G07C 5/08* | (2006.01) |
| *H04L 43/0811* | (2022.01) |

(52) U.S. Cl.
CPC ............ *B60L 58/10* (2019.02); *G07C 5/0808* (2013.01); *H04L 12/40* (2013.01); *H04L 43/0811* (2013.01); *H04L 2012/40273* (2013.01)

(58) Field of Classification Search
CPC ...... B60L 58/10; H04L 12/40; H04L 43/0811; H04L 2012/40273; G07C 5/0808
See application file for complete search history.

(56) References Cited

U.S. PATENT DOCUMENTS

| | | |
|---|---|---|
| 7,881,344 B2 | 2/2011 | Suzuki et al. |
| 8,665,700 B2 | 3/2014 | Jiang et al. |

*Primary Examiner* — Calvin Cheung
(74) *Attorney, Agent, or Firm* — David B. Kelley; Brooks Kushman P.C.

(57) ABSTRACT

A vehicle includes a plurality of controllers. During a key-off mode, a master controller may maintain operation of a predetermined set of controllers by broadcasting a power sustain request on a communication bus. Responsive to a loss of communication for a time exceeding a predetermined amount of time with one or more of the predetermined set of controllers, the master controller may be programmed to stop broadcasting the power sustain request to cause the predetermined set of controllers to power down.

16 Claims, 3 Drawing Sheets

MISSING RECEIVER POWER SUSTAIN DEACTIVATION

TECHNICAL FIELD

This application relates to a system for managing operation of controllers in a vehicle during a key-off condition.

BACKGROUND

A hybrid-electric or all-electric vehicle includes a number of controllers in communication with one another. The controllers may receive power from a battery and/or a generator. Under conditions in which power is not being generated, controllers may continue to operate and draw power. Under these conditions, the controller may be drawing power from the battery. The battery may be charged to a level that allows for the controllers to be powered for a predetermined amount of time. The predetermined amount of time may depend on the age of the battery and the charge level of the battery.

SUMMARY

A vehicle includes a controller that broadcasts a power sustain request during a key-off condition to a predetermined set of controllers via a communication bus to cause the predetermined set of controllers to remain powered on and communicating over the communication bus, and, responsive to a loss of communication for a time exceeding a predetermined amount of time with one or more of the predetermined set of controllers, stops broadcasting the power sustain request to cause the predetermined set of controllers to power down.

A method includes broadcasting, by a controller, a power sustain request to a predetermined set of controllers via a communication bus during a key-off condition, withholding, by the controller, the power sustain request responsive to a loss of communication for a time exceeding a predetermined amount of time with one or more of the predetermined set of controllers, and transitioning, by the predetermined set of controllers, to a low-power mode responsive to detecting the withholding of the power sustain request.

A controller for a vehicle includes a bus communication interface, and a processor that sends and receives messages via the bus communication interface, and, transmits a power sustain request during a key-off condition to a predetermined set of controllers via the bus communication interface to cause the predetermined set of controllers to remain powered on, and, responsive to a loss of communication for a time exceeding a predetermined amount of time with one or more of the predetermined set of controllers, stops sending the power sustain request to cause the predetermined set of controllers to power down.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
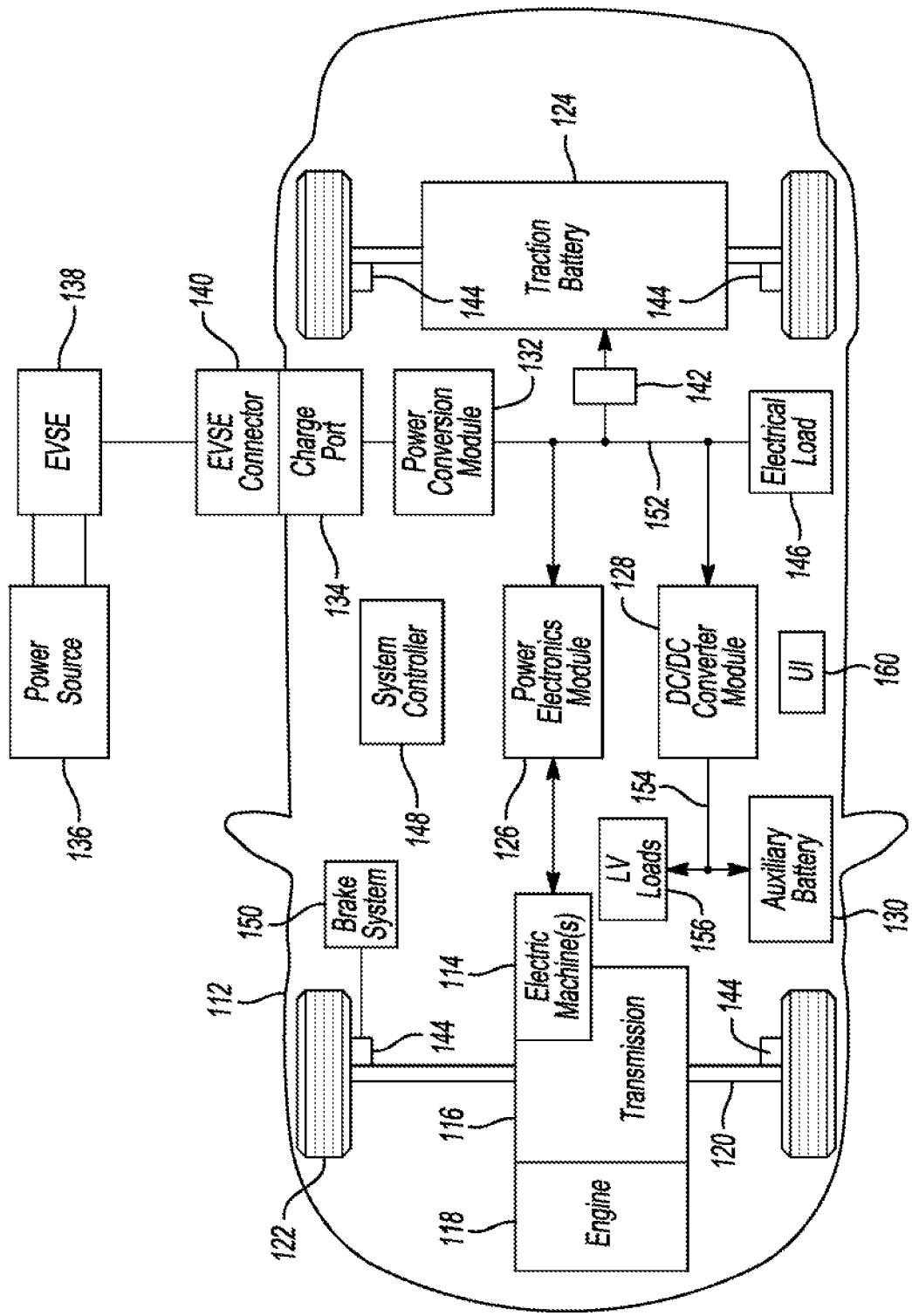
FIG. 1 is a diagram of an electrified vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DDC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144. The brake system 150 may respond to driver commands and may also operate autonomously to implement features such as stability control. The controller of the brake system 150 may implement a method of applying a requested brake force when requested by another controller or sub-function.

The electrified vehicle 112 may further include a user interface 160. The user interface 160 may provide a variety of display elements for communicating information to the operator. The user interface 160 may provide a variety of input elements for receiving information from the operator. The user interface 160 include one or more displays. The displays may be touch-screen displays. The user interface 160 may include discrete lamps/lights. For example, the lamps may include light-emitting diodes (LED). The user interface 160 may include switches, rotary knobs, and buttons for allowing the operator to change various settings. The user interface 160 may include a control module that communicates via the vehicle network. The user interface 160 may provide one or more display elements that are configured to identify diagnostic conditions. The display elements may include discrete lamps and/or messages in a message display area.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

The electrified vehicle may include a number of controllers that communicate via a communication bus. The communication may be defined by a communication protocol. The communication protocol may define the message content and timing. Further, the communication protocol may define possible responses to various messages or message content. The communication protocol may define message addressing between senders and receivers. For example, each controller communicating via the bus may be assigned a unique identifier so that messages may be sent individually to each controller. In other examples, messages may be assigned an identifier and be broadcast on the communication bus for all controllers to receive.

Figure 2:
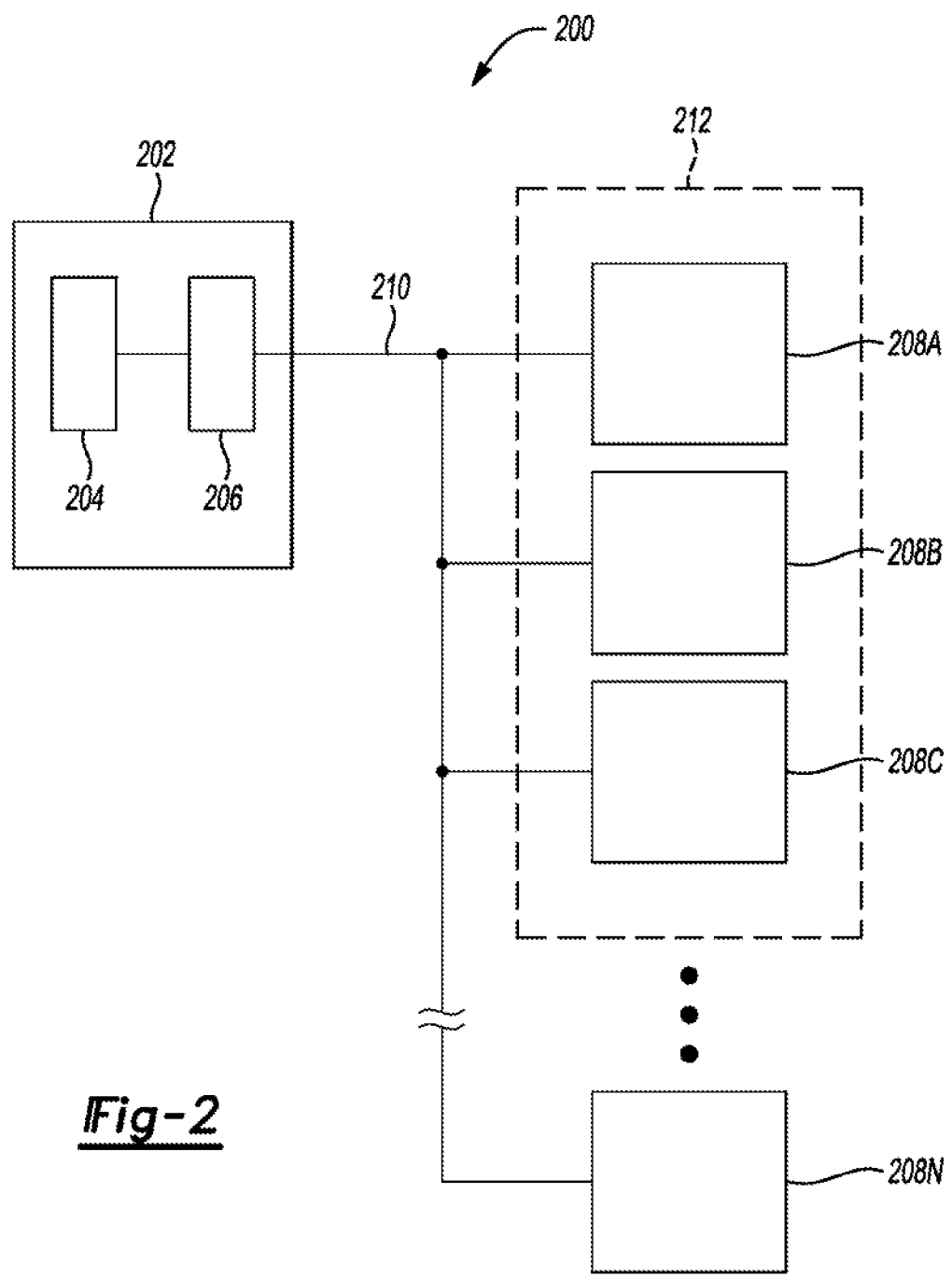
FIG. 2 is a block diagram of controllers connected to a communication bus.

FIG. 2 depicts a possible vehicle controller configuration 200 for enabling communication between controllers in a vehicle. The vehicle may include a master controller 202. The master controller 202 may include a processor 204 and a bus communication interface 206. The bus communication interface 206 may include hardware and software for communicating over a communication bus 210. The communication bus 210 may be include any type of communication link. For example, the communication bus 210 may be a CAN bus or an Ethernet network. The master controller 202 may communicate over the communication bus 210 with one or more control modules 208. The control modules 208 may be referred to as controllers and may include a processor and bus communication interface similar to the master controller 202. Each of the control modules 208 may control or operate specific components or subsystems of the vehicle.

The master controller 202 may be programmed to manage vehicle wakeup and shutdown activities. While the term master controller 202 is used, it is possible that for different features or application that any of the other control modules 208 could operate as a master controller.

During normal driving conditions (e.g., during a drive cycle), it is likely that all controllers (master controller 202 and control modules 208) are powered up and operating. As such, during a drive cycle, each of the controllers 208 may be capable of receiving and transmitting messages. During a drive cycle, the low-voltage bus 154 may receive power from the electric machines 114 and/or the traction battery 124 via the DC/DC converter module 128. Under certain conditions, only a subset of the controllers may be active for communication on the communication bus 210. Once such condition may be a key-off condition. A key-off condition may occur after a drive cycle and may be initiated by an ignition switch being placed in an off position. In addition, a charge event may use only a subset of the controllers when an external charger is connected to the vehicle. In the key-off mode, it may be desired to draw power from only those controllers 208 that are performing a function related to vehicle shutdown or battery charging.

During the key-off condition, some of the controllers (master controller 202 and a predetermined set 212 of the control modules 208) may still be operating to complete functions. For example, a battery controller may be operating to manage the shutdown of the traction battery 124. Thermal controllers may be operating to manage a temperature of a component. For example, controllers may remain operating to maintain a temperature of the traction battery 124 within a predetermined operating range. Other functions may include a body controller for operating door locks and power windows. As such, a predetermined set 212 of controllers 208 may be operable when the ignition is in a key-off state.

Since the auxiliary battery 130 may have a predetermined amount of charge storage capability, it is not feasible for the predetermined set 212 of controllers 208 to run indefinitely. For example, if one or more of the predetermined set 212 of controllers 208 is powered on indefinitely, the auxiliary battery 130 may be depleted to a level that may not support powering the controllers 208 in a drive mode. This may result in an inability to transition the vehicle to the run state. As such, it may be useful to prevent a condition in which one or more of the controllers (202, 208) could draw power indefinitely and result in a low charge level of the auxiliary battery 130.

In some configurations, the predetermined set 212 of controllers 208 may remain powered on and operating until a particular function is completed. Under normal conditions, the function is completed and the predetermined set 212 of controllers 208 may enter a sleep or low-power mode. In the sleep or low-power mode, the controllers (202, 208) may draw little or no power from the auxiliary battery 130. However, under some conditions, the function may take longer to complete or may not be completed for some reason. In these cases, the predetermined set 212 of controllers 208 may remain powered on for an extended amount of time and may drain the auxiliary battery 130.

The master controller 202 may be configured to cause the predetermined set 212 of controllers 208 to remain in a powered mode. The master controller 202 may manage the operation via the communication bus 210. For example, the master controller 202 may be configured to send a power sustain request via the communication bus 210 to inform the predetermined set 212 of controllers 208 to remain powered on and operating. The power sustain request may be implemented as a signal in a message. The signal may be assigned a value indicative of the power sustain request being active or a value indicative of the power sustain request being inactive. In other configurations, the power sustain request may be implemented as a message that is periodically broadcast on the communication bus 210 by the master controller 202. The power sustain request may be active when the message is present on the communication bus 210 and inactive when the message is absent from the communication bus 210 for more than a predetermined amount of time.

The predetermined set 212 of controllers 208 may be configured to monitor the status of the power sustain request. If the power sustain request is active, the predetermined set 212 of controllers 208 may remain powered and operating. If the power sustain request transitions to inactive, the predetermined set 212 of controllers 208 may enter the sleep or low-power mode. The master controller 202 may cause the power sustain request to transition to the inactive state when the function is completed. In some cases, the function may be unable to be completed. A condition that renders one of the predetermined set 212 of controllers 208 inoperable may inhibit completion of the function. For example, if one of the predetermined set 212 of controllers 208 becomes inoperable, it may not send a status to allow another of the controllers 208 to complete a function. Without the status, the another of the controllers 208 may never register completion its assigned functions. In this state, the controllers 208 may remain powered up and operating for an indefinite period of time.

The master controller 202 may monitor the communications received from each of the predetermined set 212 of controllers 208. The predetermined set 212 of controllers 208 may be configured to periodically send at least one message to the master controller 202 while the power sustain request is active. This allows the master controller 202 to monitor for the presence of each of the predetermined set 212 of controllers 208. A loss of communication with any of the predetermined set 212 of controllers 208 may trigger the master controller 202 to set the power sustain request to the inactive state. This condition may cause the predetermined set 212 of controllers 208 to power down to reduce the power draw.

The master controller 202 may be programmed to transmit the power sustain request during a key-off condition to the predetermined set 212 of controllers 208 via the communication bus 210. The power sustain request being active may cause the predetermined set 212 of controllers 208 to remain powered on and communicating over the communication bus 210. Various ways of implementing the messaging strategy are possible. In some configurations, the master controller 202 may broadcast a general message that includes the power sustain request that is received by all of the controllers 208 connected to the communication bus 210. In other configurations, the master controller 202 may send a message that is individually addressed to each of the predetermined set 212 of controllers 208. In this manner, only the predetermined set 212 of controllers 208 will receive and interpret the power sustain request to remain active.

The master controller 202 may be configured to send the power sustain request periodically over the communication bus 210. This may provide a periodic indication of the status of the power sustain request. In other configuration, the master controller 202 may only send the power sustain request when the status changes. This strategy may reduce message traffic on the communication bus 210. The master controller 202 may broadcast an active power sustain request message and an inactive power sustain request message. The master controller 202 may further require that each of the controllers 208 in the predetermined set 212 acknowledge reception of the power sustain request. For example, responsive to receiving the power sustain request, a controller 208 may send a predetermined message or signal back to the master controller 202 that is indicative of the power sustain request having been received.

Figure 3:
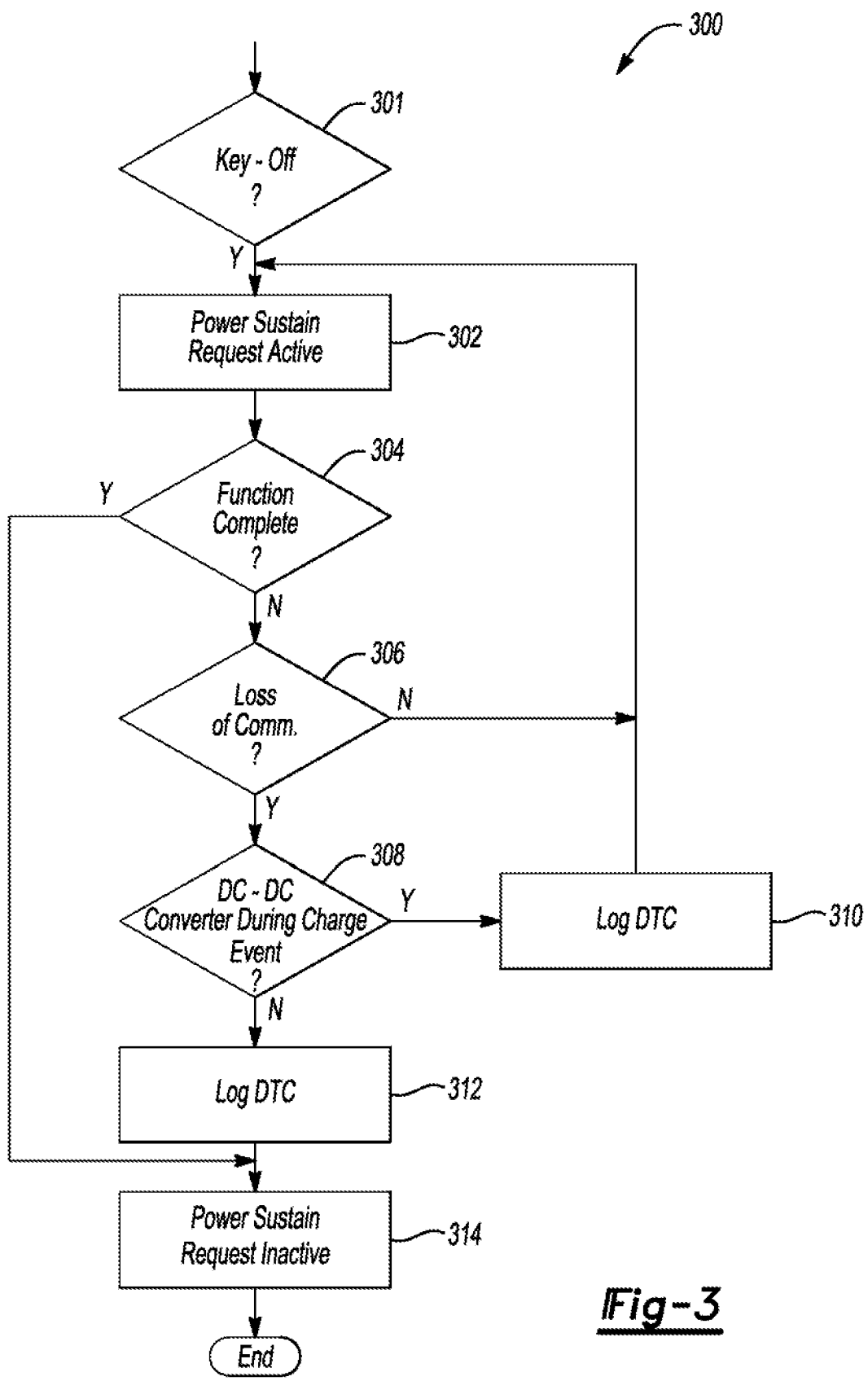
FIG. 3 is a flow chart for a possible set of operations for managing a power sustain request feature.

FIG. 3 depicts a possible flowchart 300 for a set of operations that may be implemented in one or more controllers. At operation 301, the system may determine if a key-off condition is present. A key-off event may be detected when an ignition switch is placed in an OFF position. If the key-off event is detected, operation 302 may be performed.

At operation 302, the master controller 202 may set the power sustain request to active. The master controller 202 may broadcast a message indicative of the power sustain request being active onto the communication bus 210. The master controller 202 may repeat the broadcast at predetermined time intervals. The message may be configured to be received by the predetermined set 212 of controllers 208 that are to remain powered up during the active power sustain request. The power sustain request may be broadcast as a predetermined bus message. The predetermined set 212 of controllers 208 may monitor for the presence or absence of the predetermined bus message. In other configurations, the power sustain request may be broadcast as a signal in in a predetermined bus message. The predetermined set 212 of controller 208 may monitor for a change of state of the signal to determine a state of the power sustain request.

At operation 304, the master controller 202 may determine if the function for which the active power sustain request is issued has been completed. For example, if the function is a thermal management function, the master controller 202 may monitor to determine if a component temperature has achieved a predetermined temperature. If the function is completed, operation 314 may be performed. At operation 314, the master controller 202 may set the power sustain request to inactive. For example, the master controller 202 may stop broadcasting the power sustain request message or set a corresponding signal to a value indicative of the power sustain request being inactive. If the function is not completed, operation 306 may be performed. The predetermined set 212 of controllers 208 may respond to the power sustain request being made inactive by powering down.

At operation 306, the master controller 202 may determine if a loss of communication has occurred with any of the predetermined set 212 of controllers 208. Responsive to a loss of communication for a time exceeding a predetermined amount of time with one or more controllers of the predetermined set 212 of controllers 208, the master controller 202 may cause the power sustain request to be inactive to force the predetermined set 212 of controllers 208 to power down. A loss of communication may be detected if the master controller 202 has not received any messages from any one of the controllers of the predetermined set 212 of controllers 208 within a predetermined amount of time (e.g., six seconds). Each controller of the predetermined set 212 of controllers 208 may be programmed to transmit a periodic message to the master controller 202. The time between messages sent by the controllers 208 may be less than the predetermined amount of time for detecting the loss of communication. If the master controller 202 does not receive the message with the predetermined amount of time, a loss of communication with the controller 208 may be suspected. If no loss of communication is detected, operation 302 may be repeated. If a loss of communication is detected, operation 308 may be performed.

One of control modules 208 in the predetermined set 212 of the controllers 208 may be the DC/DC converter 128. At operation 308, the master controller 202 may check if the loss of communication is only with the DC/DC converter 128 during a charge event. If the loss of communication is only with the DC/DC converter 128 during the charge event, operation 310 may be performed. At operation 310, a diagnostic trouble code (DTC) may be logged that is indicative of a loss of communication with the DC/DC converter 128. Logging the DTC may include storing a DTC in non-volatile memory and displaying a status of the condition on the user interface 160. If the loss of communication is not only with the DDC converter 128, operation 312 may be performed.

At operation 312, a DTC may be logged indicating the loss of communication and identifying which of the predetermined set 212 of controllers 208 lost communication. At operation 314, the master controller 202 may cause the power sustain request to be inactive. When the power sustain request is inactive, the predetermined set 212 of controllers 208 may power down and enter the low-power mode. At this time, the master controller 202 may also enter the low-power mode. This ensures that the controllers 208, 202 do not stay powered on indefinitely when a condition occurs that inhibits a normal shutdown routine.

The system and methods described improve vehicle operation by preventing the auxiliary battery from becoming depleted. By intelligently managing the power down process, sufficient charge may be maintained by the battery to restart the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller programmed to
broadcast a power sustain request during a key-off condition to a predetermined set of controllers via a communication bus to cause the predetermined set of controllers to remain powered on and communicating over the communication bus,
responsive to a loss of communication for a time exceeding a predetermined amount of time with one or more of the predetermined set of controllers, stop broadcasting the power sustain request to cause the predetermined set of controllers to power down, and
log a diagnostic code indicative of the loss of communication for the one or more of the predetermined set of controllers.

2. The vehicle of claim 1, wherein the predetermined set of controllers includes a DC/DC power converter and the controller is further programmed to, responsive to a loss of communication with only the DC/DC power converter during a charge event, log a diagnostic code for the DC/DC power converter and continue to broadcast the power sustain request.

3. The vehicle of claim 1, wherein the predetermined amount of time is six seconds.

4. The vehicle of claim 1, wherein the controller is programmed to broadcast the power sustain request as a predetermined bus message and the predetermined set of controllers are programmed to power down responsive to not receiving the predetermined bus message for a time exceeding the predetermined amount of time.

5. The vehicle of claim 1, wherein the controller is further programmed to broadcast the power sustain request as a signal in a predetermined bus message and,
responsive to a loss of communication for a time exceeding the predetermined amount of time with one or more of the predetermined set of controllers,
change a status of the signal to indicate an inactive state and
continue to send the predetermined bus message that contains the signal.

6. The vehicle of claim 5, wherein the predetermined set of controllers are programmed to power down responsive to a change of state of the signal in the predetermined bus message indicative of the power sustain request changing from active to inactive.

7. The vehicle of claim 1, wherein each of the predetermined set of controllers are programmed to transmit at least one message on the communication bus at time intervals that are less than the predetermined amount of time while the power sustain request is active.

8. A method comprising:
broadcasting, by a controller, a power sustain request to a predetermined set of controllers via a communication bus during a key-off condition;
withholding, by the controller, the power sustain request responsive to a loss of communication for a time exceeding a predetermined amount of time with one or more of the predetermined set of controllers;
sending, by the predetermined set of controllers, at least one bus message on the communication bus at time intervals less than the predetermined amount of time when receiving the power sustain request; and
transitioning, by the predetermined set of controllers, to a low-power mode responsive to detecting the withholding of the power sustain request.

9. The method of claim 8, further comprising logging, by the controller, a diagnostic trouble code indicative of the loss of communication with the one or more predetermined set of controllers.

10. The method of claim 8, further comprising detecting, by the predetermined set of controllers, the withholding of the power sustain request by monitoring for an absence of a message indicative of the power sustain request on the communication bus.

11. The method of claim 8, further comprising detecting, by the predetermined set of controllers, the withholding of the power sustain request responsive to a change of state of a signal in a bus message to a state indicative of the power sustain request being inactive.

12. The method of claim 8, further comprising responsive to the loss of communication with only one of the predetermined set of controllers during a charge event and the one of the predetermined set of controllers being a DC/DC power converter, logging, by the controller, a diagnostic code for the DC/DC power converter and continuing to broadcast the power sustain request.

13. A controller for a vehicle comprising:
a bus communication interface; and
a processor programmed to
send and receive messages via the bus communication interface, and, transmit a power sustain request during a key-off condition to a predetermined set of controllers via the bus communication interface to cause the predetermined set of controllers to remain powered on,
responsive to a loss of communication for a time exceeding a predetermined amount of time with one or more of the predetermined set of controllers, stop sending the power sustain request to cause the predetermined set of controllers to power down, and
stop sending the power sustain request by changing a status of a signal indicative of the power sustain request in a message to a state indicative of the power sustain request being off.

14. The controller of claim 13, wherein the predetermined set of controllers includes a DC/DC converter, and the processor is further programmed to, responsive to a loss of communication with only the DC/DC converter during a charge event, log a diagnostic code for the DC/DC converter and continue to transmit the power sustain request.

15. The controller of claim 13, wherein the processor is further programmed to stop sending the power sustain request by inhibiting transmission of a message that contains a signal indicative of the power sustain request.

16. The controller of claim 13, wherein the processor is further programmed to, responsive to the loss of communication for the time exceeding a predetermined amount of time, log a diagnostic code indicative of the loss of communication for the one or more of the predetermined set of controllers.

* * * * *